United States Patent

Shaklee et al.

[11] Patent Number: 6,166,825
[45] Date of Patent: Dec. 26, 2000

[54] FIBER CHANNEL DATA TRANSFER WITH FEEDBACK CONTROL WITHIN A PHOTOGRAPHIC PROCESS PRINTER SYSTEM

[75] Inventors: Kerry L. Shaklee, Brighton; Richard W. Denny; Kurt A. Leniger, both of Littleton; William M. Glenn, Jr., Evergreen; Daniel C. O'Brien, Conifer, all of Colo.

[73] Assignee: Sienna Imaging, Inc., Englewood, Colo.

[21] Appl. No.: 09/211,142

[22] Filed: Dec. 14, 1998

[51] Int. Cl.[7] .................................................. G06F 15/00
[52] U.S. Cl. .......................................... 358/1.15; 358/1.13
[58] Field of Search ................................. 358/1.15, 1.13, 358/1.1, 1.3, 1.6, 1.16, 1.17, 1.18, 1.14, 1.9, 1.11, 407, 434–439, 442, 468, 296; 710/8, 14–15, 19, 62, 72; 359/143, 151; 347/3, 5; 399/1, 2, 8

[56] References Cited

U.S. PATENT DOCUMENTS

| | | | |
|---|---|---|---|
| 4,926,348 | 5/1990 | Franics | 358/1.3 |
| 5,014,221 | 5/1991 | Mogul | 358/1.14 |
| 5,220,674 | 6/1993 | Morgan et al. | 358/1.11 |
| 5,577,172 | 11/1996 | Vatland et al. | 358/1.16 |
| 5,633,942 | 5/1997 | Gyllenskog | 358/1.15 |
| 5,651,114 | 7/1997 | Davidson, Jr. | 358/1.15 |
| 5,727,135 | 3/1998 | Webb et al. | 358/1.14 |
| 5,774,637 | 6/1998 | Haber et al. | 358/1.13 |
| 5,854,886 | 12/1998 | MacMillan et al. | 358/1.15 |

*Primary Examiner*—Dov Popovici
*Attorney, Agent, or Firm*—James R. Young

[57] ABSTRACT

In a photographic process printer system that receives printable pixel data into a print engine component from a computer component over a high-speed fiber channel communication pathway. Feedback control messages from the print engine component are sent over a low-speed serial channel communication pathway to the computer component to control the transmission of printable pixel data. The computer component continues to transmit packets of printable pixel data over the high-speed fiber channel communication pathway as long as the feedback control messages indicate that the print engine component is ready to receive more packets of printable pixel data.

48 Claims, 5 Drawing Sheets

FIBER CHANNEL DATA TRANSFER WITH FEEDBACK CONTROL WITHIN A PHOTOGRAPHIC PROCESS PRINTER SYSTEM

FIELD OF THE INVENTION

This invention relates to transferring data over a fibre channel and more particularly to transferring printable pixel data from a digital image data processing system to a print engine. Even more particularly, the invention relates to processing digital image data into printable pixel data, transferring the printable pixel data from a local bus in a digital image data processing system over a fibre channel to a system bus in a print engine, and sending feedback control messages from the print engine to the digital image data processing system.

BACKGROUND OF THE INVENTION

Photographic process printers that utilize CRT's for exposing a photosensitive medium have typically used proprietary hardware and software components for transferring digital image data from a central processing unit to the print engine. The digital image data is processed to create printable pixel data, and then used to expose the photosensitive medium to produce the desired image. Thus, the central processing unit (CPU) and the print engine have been one integral unit. In some situations, it would be advantageous to be able to separate the CPU, and the processing of the digital image data into printable pixel data, from the printer engine. This might be advantageous for environmental reasons, safety reasons due to the chemicals used in the developing processes, ease of use, or physical limitations on the space allocated for the photographic process printer system.

In addition, proprietary hardware components in such systems, such as the CPU and local bus, are expensive to design, maintain, and often do not transfer data at the higher speeds found in newer standard CPUs and buses. Thus, it is harder to take advantage of frequent advancements in computer technology to improve the performance of the photographic process printer system. Since digital image data tends to be quite large, data transmission is a limiting factor in the speed at which photographic process printers can process digital image data into printable pixel data to expose the photosensitive medium to produce desired images.

It is thus apparent that there is a need in the art for an improved photographic process printer system that does not require as many proprietary hardware components for processing digital image data, and thus can be more easily improved as new advancements in computer technology occur. There is a further need in the art for the CPU, which processes the digital image data into printable pixel data, to be physically separated from the print engine component in such systems, and to be able to control the print engine component from the CPU. There is also a need for a photographic process printer system that can receive printable pixel data in the print engine component from the CPU at higher speeds to shorten the time it takes to send data and expose an image. The present invention meets these and other needs in the art.

SUMMARY OF THE INVENTION

In a photographic process printer system, it is an aspect of the present invention to utilize a central processing unit in a computer component that is physically separated from the print engine component.

It is another aspect of the invention to process digital image data into printable pixel data in the central processing unit of the computer component prior to sending the printable pixel data to the print engine component.

Yet another aspect of the invention is to transfer printable pixel data from the computer component to the print engine component utilizing a high-speed communication pathway.

Still another aspect of the invention is to control the photographic process printer system from the central processing unit in the computer component, that is physically separated from the print engine component, in a photographic process printer system.

A further aspect of the invention is to provide feedback control messages from the print engine component to the computer component over a low-speed communication pathway.

A still further aspect of the invention is to process the feedback control messages in the central processing unit in the computer component and make appropriate adjustments to control the print engine component.

The above and other aspects of the invention are accomplished in a photographic process printer system that utilizes a high-speed communication pathway to transfer printable pixel data from a computer component to a print engine component. The photographic process printer system also utilizes a low-speed communication pathway to transfer feedback control messages from the print engine component to the computer component. The present invention uses a high-speed serial fibre channel for the high-speed communication pathway. Fibre channels are currently used as a type of high-speed transmission pathway internal to a computer, as well as for a network medium, such as a high-speed backbone in a LAN. Fibre channels may be constructed out of fibre optic cable or copper wire cable.

In the preferred embodiment of the invention the communication is unidirectional over the fibre channel from the computer component to the print engine component. Feedback control messages are sent from the print engine component unidirectionally over a low-speed communication pathway to the computer component and are used to control the transmission of to printable pixel data, and serve other control purposes. State information on the print engine component for generating the feedback control messages may be obtained through either a polling scheme or an interrupt scheme.

In the preferred unidirectional embodiment of the invention, a low-speed serial cable serves as the low-speed communication pathway, connecting the print engine component to the computer component. The computer component transmits printable pixel data over the high-speed fibre channel to the print engine component. After processing a row of printable pixel data for exposing the photosensitive medium, the print engine component gathers state information on the print engine component through either a polling or interrupt scheme. Based on the state information received, feedback control messages are then transmitted from the print engine component over the low-speed cable to the computer component. The fibre channel and the low-speed cable may be two separate cables with separate connectors at both ends, or wrapped together in one cable with one common connector, or two separate connectors, at both ends.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
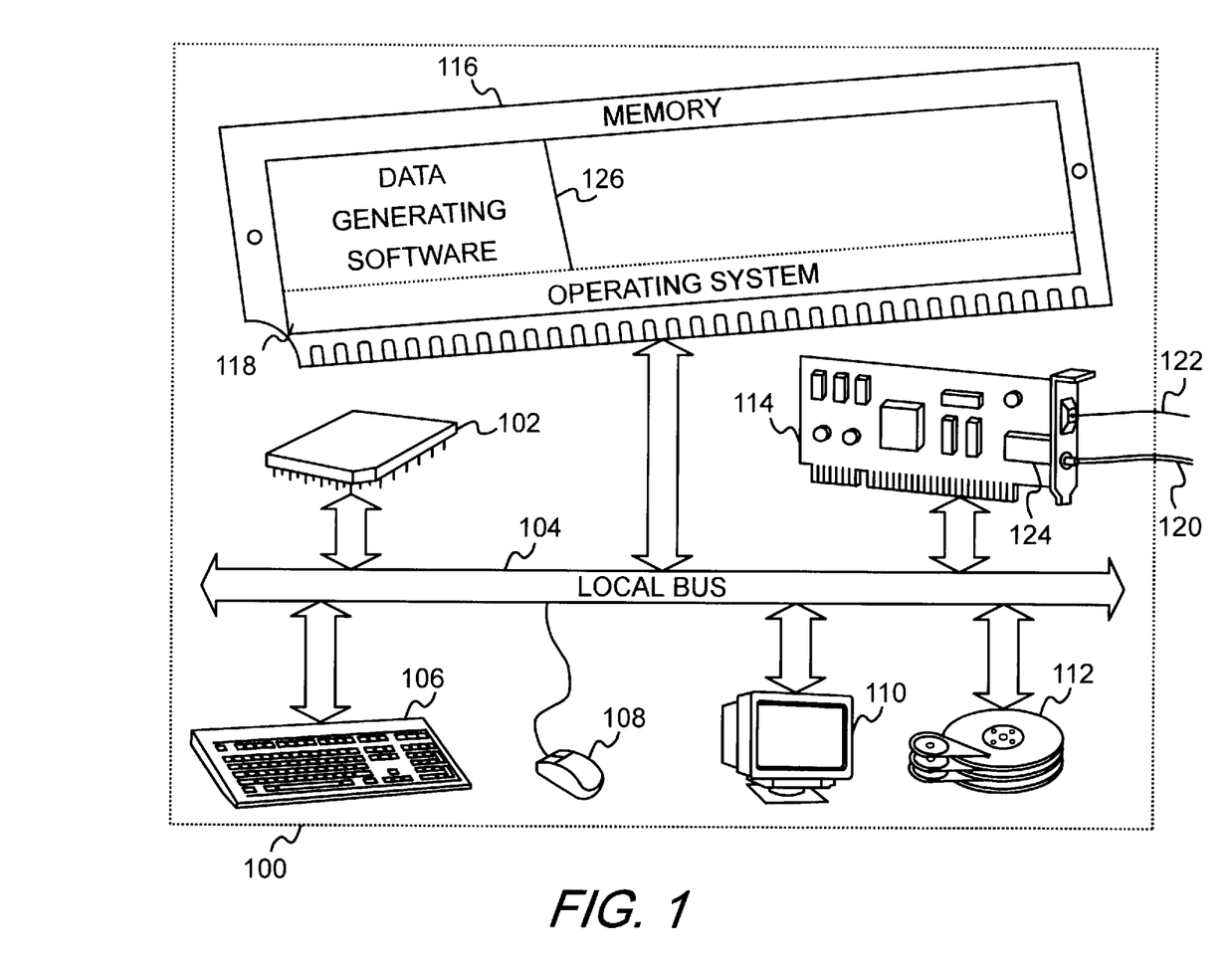
FIG. 1 shows a block diagram of a computer component of a photographic process printer system.

FIG. 1 shows a block diagram of a computer component of a photographic process printer system. In the preferred embodiment of the invention, the computer component is a computer with a 166 MHz Pentium™ processor. One skilled in the art will recognize that processors of other brands and speeds could also be used in the invention. Referring now to FIG. 1, computer component 100 of a photographic process printer system contains a central processing unit 102. Central processing unit 102 communicates to other elements of computer component 100 over a local bus 104. In the preferred embodiment of the invention, local bus 104 is an industry standard PCI (Peripheral Component Interconnect) local bus. A keyboard 106 allows a user to input information into computer component 100, and a graphics display 110 allows computer component 100 to output information to the user. A mouse 108 is also used to input information.

Figure 3:
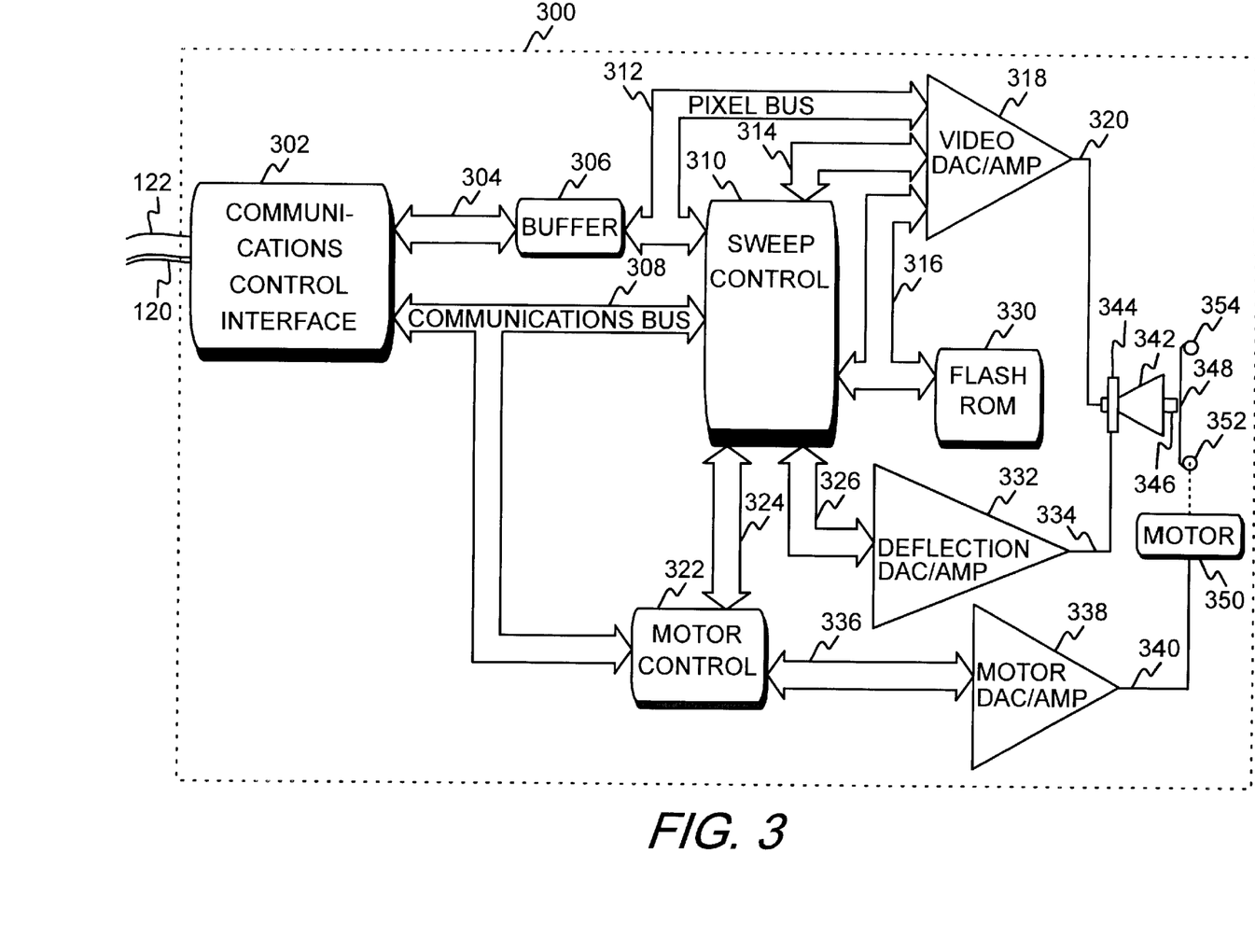
FIG. 3 shows a block diagram of a print engine component of a photographic process printer system.

Local bus card 114, also connected to local bus 104, has fibre channel 120 for a high-speed serial communication pathway for sending data, referred to as a down link, from computer component 100 to print engine component 300 (FIG. 3). Local bus card 114 also has cable 122 for a low-speed serial communication pathway for sending data, referred to as an up link, from print engine component 300 to computer component 100. In the preferred embodiment of the invention, local bus card 114 is a PCI local bus card. Fibre channel 120 may be an optical fibre cable or copper wire cable according to standard industry specifications, such as the ANSI X3T11 Fibre Channel Standards, utilizing standard communications protocols, such as one of the FCSI Fibre Channel Profiles. Cable 122 is a copper wire cable and is also of standard industry specifications utilizing standard communications protocols that are distinct from fibre channel 120.

Storage device 112 is used to store data and programs within computer component 100. A memory 116, also attached to local bus 104, contains an operating system 118 and data-generating software 126. In the preferred embodiment of the invention, operating system 118 is the Microsoft® Windows NT™ operating system, and data-generating software 126 is proprietary. One skilled in the art will recognize that other commercial operating systems could also be used.

Data-generating software 126 loads digital image data off of storage device 112, bringing it into memory 116. Data-generating software 126 then processes the digital image data in central processing unit 102 into the form required by print engine component 300 (FIG. 3). The digital image data is converted into printable pixel data, which for color CRTs is in the form of the component red, green, and blue RGB values, and for monochrome CRTs is in the form of a gray scale value. The printable pixel data is sent in packets from central processing unit 102 across the PCI bridge (not shown in FIG. 1) over local bus 104 to local bus card 114. Each packet begins with a header containing print and control commands. The packets are sent using a chained DMA (direct memory access) approach. Each packet contains a pointer to the next packet. In the preferred embodiment of the invention, the printable pixel data is sent in packets over local bus 104 at the burst rate of 133 Mb/sec.

Figure 2:
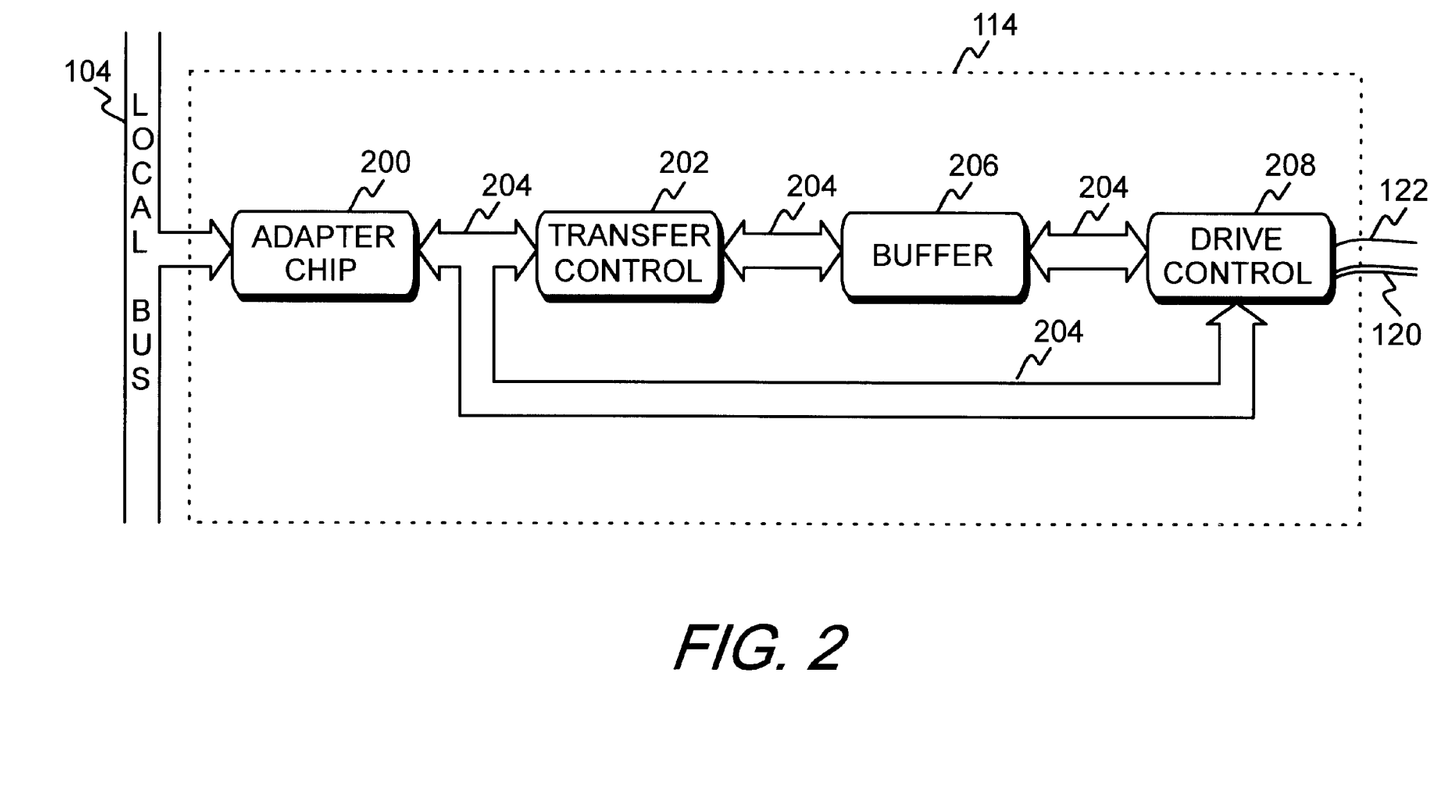
FIG. 2 shows a block diagram of the interface in the local bus card in the computer component of a photographic process printer system.

FIG. 2 shows a block diagram of the interface in the local bus card in the computer component of a photographic process printer system. Referring now to FIG. 2, adapter chip 200 within local bus card 114 (also shown in FIG. 1) receives packets of printable pixel data from local bus 104 (also shown in FIG. 1) and handles the bus mastering on local bus 104. In the preferred embodiment of the invention adapter chip 200 is a PCI adapter chip. Connected to adapter chip 200 is local interface bus 204, which transfers data to the other components within local bus card 114.

Transfer control 202 receives the packets of printable pixel data from adapter chip 200 over local interface bus 204. Transfer control 202 functions to keep buffer 206 filled with packets of printable pixel data. In the preferred embodiment of the invention, transfer control 202 is a field programmable gate array and buffer 206 is a first in-first out (FIFO) buffer that is 32 bits wide by 1 k deep. Transfer control 202 monitors buffer 206 and communicates with adapter chip 200 in order to keep buffer 206 filled.

Transfer control 202 handles the chained DMA packets. Once data-generating software 126 (FIG. 1) builds up the chained DMA packet list to a certain size in buffer 206, control is turned over to transfer control 202. After receiving control, transfer control 202 operates independently from what central processing unit 102 (FIG. 1) is doing. Central processing unit 102 just keeps building printable pixel data and adding packets of printable pixel data to the chained DMA packet list. Transfer control 202 follows the pointers in the packets and gets the packets from adapter chip 200 and transfers the packets to buffer 206. Central processing unit 102 sends packets of printable pixel data on a mostly continuous basis, except for the dead times associated with the electron beam turnaround in the CRT at the end of each sweep and during any up links. A synchronous data exchange protocol insures that up links occur only when there is no down link going on. Packets of printable pixel data are not transmitted to print engine component 300 (FIG. 3) until an up link message says it is OK to do so. An up link can be a blank packet that just says that it is time to send the next packet of printable pixel data down, or it can contain status information on print engine component 300 as well.

Packets of printable pixel data are transferred from buffer 206 over local interface bus 204 to drive control 208.

Connected to drive control 208 are fibre channel 120 and cable 122 (also shown in FIG. 1). Packets of printable pixel data are sent in a down link from drive control 208 over fibre channel 120 to print engine component 300. In the preferred embodiment of the invention, the packets of printable pixel data are transmitted in a down link over fibre channel 120 at 25 Mb/sec.

FIG. 3 shows a block diagram of a print engine component of a photographic process printer system. In the preferred embodiment of the invention, the print engine component is a photographic process printer, which may utilize a color or monochrome CRT. One skilled in the art will recognize that other types of print engines could also be connected by fibre channel 120 and cable 122 to computer component 100 of the present invention. Such print engines include, but are not limited to, laser, ink jet, semiconductor laser diode or three-color (RGB) semiconductor laser diode, solid state laser, piezoelectric light shutter, LED, field emission display, vacuum florescent, or micro mirror print engines.

Referring now to FIG. 3, print engine component 300 contains communications control interface 302, which serves as the interface between the serial data and parallel data. Communications control interface 302 handles the dispatching of data, received in down links from drive control 208 (FIG. 2) over fibre channel 120 (FIG. 1), to wherever it needs to go. Communications control interface 302 reads and interprets the commands in the header in each packet, and sends printable pixel data to buffer 306 over bus 304. Communications data is sent by communications control interface 302 over communications bus 308 to either sweep control 310 or motor control 322. Sweep control 310 processes motor data, buffers it, and then sends it to motor control 322. Motor control 322 sends the motor data over bus 336 to motor DAC/AMP 338, which is a digital-to-analog converter and amplifier. Output signal 340 from motor DAC/AMP 338 drives motor 350, which moves medium roll 352, advancing medium 348 past CRT fiber optic faceplate 346.

In the preferred embodiment of the invention, buffer 306 is a two-line ping-pong buffer. A complete row of printable pixel data for exposing a line on medium 348 is sent from communications control interface 302 over bus 304 and is stored in a first line of buffer 306. Buffer 306 then sends that row of printable pixel data to a Video DAC/AMP 318, which is a digital-to-analog converter and amplifier. Once that row of printable pixel data is being sent, a next row of printable pixel data is stored in a second line of buffer 306. While the second row of printable pixel data is being sent to Video DAC/AMP 318, another row of printable pixel data is being stored in the first line of buffer 306, and so on.

Sweep control 310 coordinates communications control interface 302 and motor control 322 in real time. Sweep control 310 sends a clock signal to motor control 322 for synchronization purposes. Sweep control 310 also interprets the header for each row of printable pixel data in buffer 306 to determine what sweep line each row represents, as well as other information necessary for processing. Sweep control 310 controls the writing of the row of pixel data over pixel bus 312 to Video DAC/AMP 318. At the same time, a video control signal is sent from sweep control 310 over video control 314 to video DAC/AMP 318. Also at the same time, weep control 310 is reading uniformity data. Uniformity data corrects for the non-uniformity of the phosphor coating within CRT 342. The uniformity data is read out of flash ROM 330 and is sent over bus 316 to video DAC/AMP 318 in order to correct output signal 320. Sweep control 310 also interleaves the uniformity data with horizontal line data, vertical line data, and focus data and sends this information over bus 326 to deflection DAC/AMP 332, which is a digital-to-analog converter and amplifier. Sweep control 310 also interleaves the uniformity data with motor data and sends this information over bus 324 to motor control 322.

Every CRT requires its own uniformity data, horizontal and vertical deflection data, and motor data which are stored in correction tables in flash ROM 330 for each mode. A mode is engineered to maximize the print rate for a specified resolution and horizontal sweep width. Typical modes for a photographic process printer might include 500 dpi with a twelve-inch sweep, 300 dpi with a twelve-inch sweep, and 250 dpi with a ten-inch sweep. Flash ROM 330 holds all the data for each of the modes in compressed format in one section. A user, through data-generating software 126 (FIG. 1), normally selects a mode prior to beginning processing. The expanded version of the selected mode is then made resident in another section of flash ROM 330.

The output signal 320 of the Video DAC/AMP 318 is connected to CRT 342 and is used to modulate an electron beam within CRT 342. Light created when the electron beam strikes at least one of the three color phosphor stripes of a color CRT, or strikes the single stripe of a monochrome CRT, is conducted through a CRT fiber optic faceplate 346 to expose a medium 348 adjacent to CRT fiber optic faceplate 346. Medium 348 is photosensitive, recording the printable pixel data displayed on CRT 342 and conducted through CRT fiber optic faceplate 346. After exposure is complete, medium 348 is sent to a chemical processor (not shown in FIG. 3) for developing.

Output signal 334 from deflection DAC/AMP 332 controls the deflection of the electron beam of CRT 342. Electron beam deflection of CRT 342 is controlled magnetically by a CRT yoke 344, having a CRT vertical drive and a CRT horizontal drive (not shown in FIG. 3), which receive output signal 334. Deflection of the electron beam may also be controlled electrostatically by sending output signal 334 to a CRT having electrostatic plates instead of a magnetic yoke.

Operation of the system begins when data-generating software 126 receives operating specifications regarding print engine component 300. Each print engine component 300 has unique operational characteristics, which are normally downloaded onto a floppy disk, and then uploaded into computer component 100 (FIG. 1). Thus, one computer component 100 may control any print engine component 300 if it has uploaded that print engine component's operational specifications.

Before packets of printable pixel data are transmitted from computer component 100, program information based on the operating specifications of print engine component 300, and the desired resolution of the final image, are sent from computer component 100 to sweep control 310 in print engine component 300. This program information makes the proper mode resident to handle the printable pixel data to be received. If the user desires a different resolution, then a new program is sent to sweep control 310 prior to sending the printable pixel data.

Digital image data, which may be color or monochrome, is received into computer component 100 through various means, such as direct input from a scanner (not shown in FIG. 1), or from digital image data stored on a local area network. The digital image data, which may represent one or more different images, is processed by data-generating software 126 in central processing unit 102 (FIG. 1). Prior art photographic process printer systems process the digital image data in the print engine component into printable pixel data. In the present invention, the digital image data is processed by central processing unit 102 into printable pixel data prior to being sent to print engine component 300 so that the printable pixel data may be utilized in print engine component 300 without further processing.

For each line of color digital image data, data-generating software 126 separates out the red, blue, and green components, and intensity parameters are determined. Then, central processing unit 102 converts the red, green, and blue components with intensity parameters into printable pixel data. Three rows of printable pixel data, one for red, one for blue, and one for green, are sent from buffer 306 to CRT 342 to expose one line of medium 348 to produce the desired image. For each line of monochrome digital image data, intensity parameters are determined and each line of digital image data is converted into printable pixel data. One row of printable pixel data sent from buffer 306 to CRT 342 is sufficient to expose one line of medium 348 to produce the desired image. However, each row may be used more than once to enhance the quality of the exposed image.

Central processing unit 102 sends packets of printable pixel data over local bus 104 to local bus card 114 (FIG. 1). Local bus card 114 sends the packets of printable pixel data over fibre channel 120, to print engine component 300. Communications control interface 302 in print engine component 300 receives the packets of printable pixel data over fibre channel 120. Printable pixel data is passed from communications control interface 302 over bus 304 to buffer 306. Buffer 306 stores complete rows of printable pixel data, and sweep control 310 sends the complete rows of printable pixel data from buffer 306, one row at a time, to video DAC/AMP 318.

Video DAC/AMP 318 modulates the electron beam intensity according to the printable pixel data taken a row at a time in a forward order to expose medium 348 to produce the appropriate image desired. At the same time, output signal 320 sweeps the electron beam of CRT 342 across the phosphor stripe(s) in a forward direction, while motor control 322, motor DAC/AMP 338, and motor 350 are then used to move medium 348 in front of CRT fibre optic faceplate 346. The process is repeated in a sweep in the reverse direction, where the next row of printable pixel data is taken in a reverse order. For a color CRT, one line of medium 348 is completely exposed after all three phosphor stripes—red, green, and blue—have been swept and modulated with a row of red, green, and blue printable pixel data on the same line of medium 348. This process is repeated until all of the rows of printable pixel data for an image have been used, exposing the image onto medium 348.

After sweep control 310 transfers each row of printable pixel data from buffer 306 to Video DAC/AMP 318, state information regarding the processing status of print engine component 300 is received by sweep control 310 from the various components of print engine component 300. This is accomplished through either a polling scheme or an interrupt scheme. Feedback control messages based on the state information received are then sent in a packet from sweep control 310 over communications bus 304 to communications control interface 302, over cable 122, and back to computer component 100.

Drive control 208 in local bus card 114 receives the packet containing feedback control messages from cable 122, and passes the feedback control messages over local interface bus 104 to central processing unit 102. Based on the nature of the feedback control messages, central processing unit 102 may alter or adjust parameters regarding the remaining printable pixel data to be transmitted to print engine component 300, or take other appropriate action. Transmission of printable pixel data may be increased, slowed, or stopped entirely depending upon the evaluation of the feedback control messages received.

Figure 4:
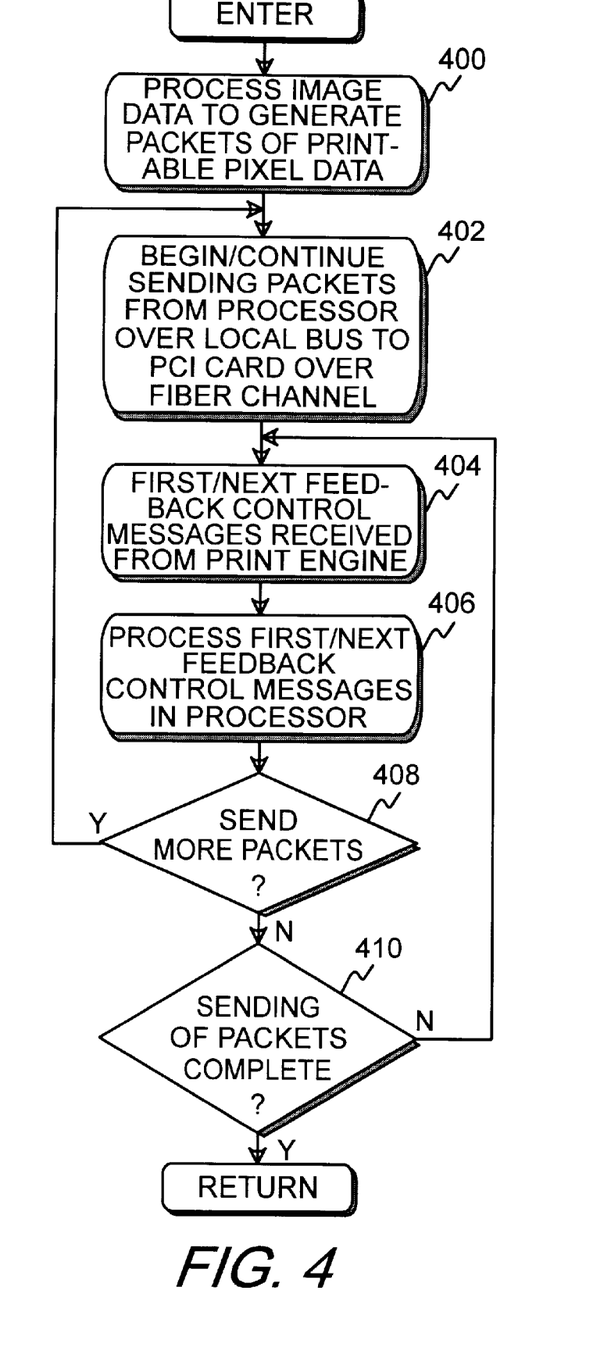
FIG. 4 shows a flow chart of a computer component in the preferred embodiment of the invention that utilizes a high-speed if serial fibre channel for transmitting printable pixel data to the print engine component, and a low-speed serial cable for receiving feedback control messages from the print engine component.

FIG. 4 shows a flow chart of the computer component in the preferred embodiment of the invention that utilizes a high-speed serial fibre channel for transmitting printable pixel data to the print engine component, and a low-speed serial cable for receiving feedback control messages from the print engine component. Referring now to FIG. 4, in block 400 a call is made to data-generating software 126 (FIG. 1). Digital image data, which may represent one or more different images, is then processed in central processing unit 102 (FIG. 1) by data-generating software 126 to generate packets of printable pixel data.

In block 402, central processing unit 102 begins sending the packets of printable pixel data over local bus 104 to local bus card 114, and from local bus card 114 over fibre channel 120 (FIG. 1) to print engine component 300 (FIG. 3).

Figure 5:
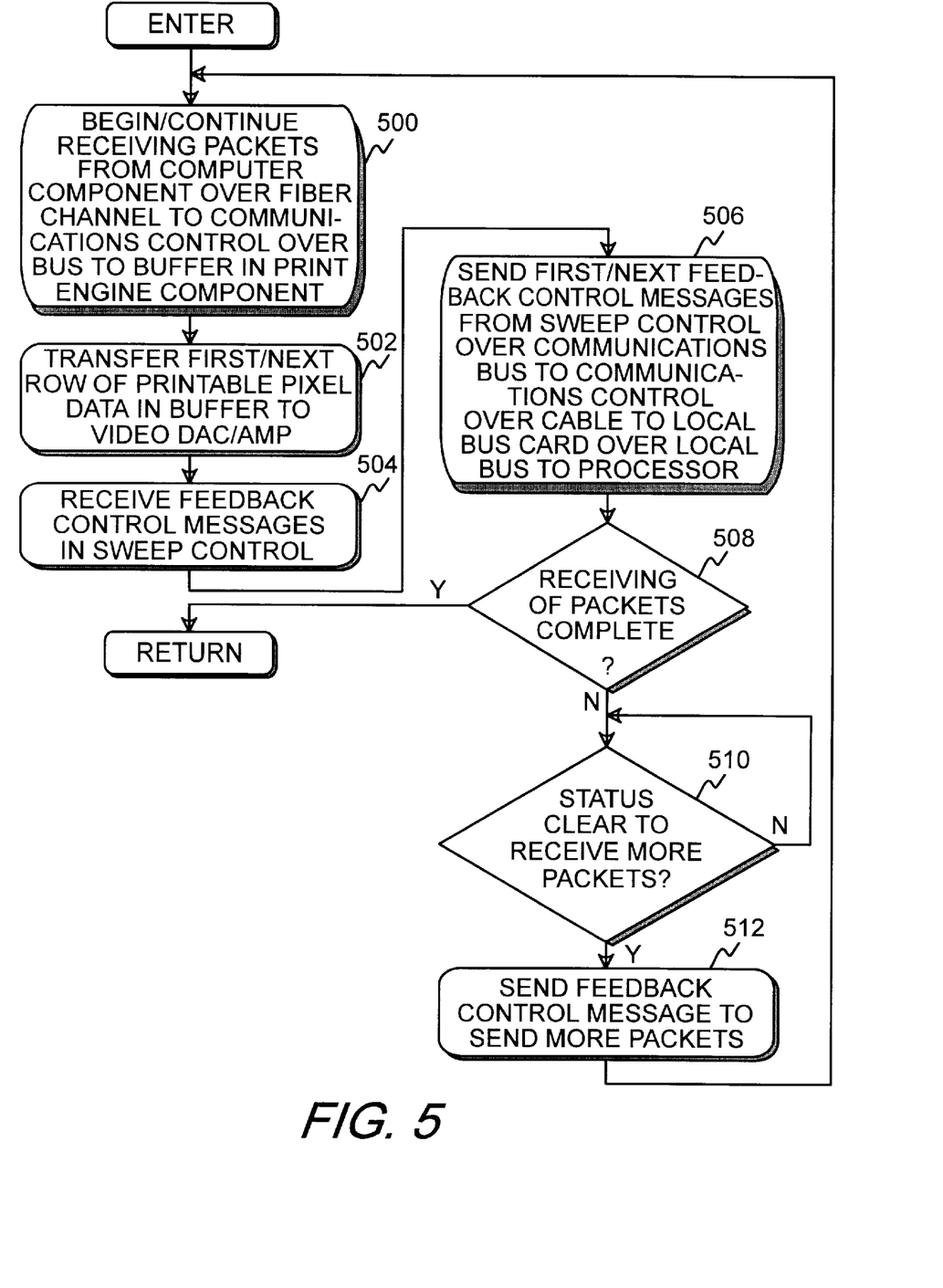
FIG. 5 shows a flow chart of a print engine component in the preferred embodiment of the invention that utilizes a high-speed serial fibre channel for receiving printable pixel data from the computer component and a low-speed serial cable for transmitting feedback control messages to the computer component.

In block 404, local bus card 114 receives feedback control messages from print engine component 300 (FIG. 3) over cable 122 (FIG. 1) from step 506 from FIG. 5, and transfers them to central processing unit 102 over local bus 104. In block 406 central processing unit 102 processes the feedback control messages received in block 404.

In block 408, central processing unit 102 determines, based on the processing of feedback control messages in block 406, whether to continue sending the packets of printable pixel data. If the determination in block 408 is to send more printable pixel data, control returns to block 402. If the determination in block 408 is to not send more packets of printable pixel data, control passes to block 410, which determines if the sending of all the packets of printable pixel data is complete. If the sending of all the packets of printable pixel data is complete, then control returns to data-generating software 126. If in block 410 the sending of all the packets of printable pixel data is not complete, then control returns to block 404 where central processing unit 102 listens for the next feedback control messages from print engine component 300.

FIG. 5 shows a flow chart of print engine component in the preferred embodiment of the invention that utilizes a high-speed serial fibre channel for receiving printable pixel data from the computer component, and a low-speed serial cable for transmitting feedback control messages to the computer component. Referring now to FIG. 5, in block 500 print engine component 300 (FIG. 3) begins to receive packets of printable pixel data. The printable pixel data is sent from central processing unit 102 over local bus 104 to local bus card 114, over fibre channel 120 (FIG. 1) from step 402 from FIG. 4, and to communications control interface 302 over bus 304 to buffer 306 (FIG. 3).

In block 502, sweep control 310 controls the transfer of the first row of printable pixel data from buffer 306 over pixel bus 312 to video DAC/AMP 318 (FIG. 3). In block 504 sweep control 310 receives feedback control messages regarding the state of various components of print engine component 300. The state information is in the form of status bits. Various states may exist at any particular time within the various components of print engine component 300 that could affect the ability of print engine component 300 to handle more packets of printable pixel data. For example, print engine component 300 may require a recalibration of CRT 342, or medium 348 (FIG. 3) may need to be moved, or did not move, when it should have.

In block 506, the feedback control messages received in block 504 are sent from sweep control 310 over communications bus 308 (FIG. 3) to communications control interface 302. From communications control interface 302, the feedback control messages are sent over cable 122 (FIG. 2) to local bus card 114, and from local bus card 114 over local bus 104 to central processing unit 102. Control then passes to block 508.

Block 508 determines if the receiving of all the packets of printable pixel data is complete. If the receiving of all the packets of printable pixel data for an image is complete, then control returns to data-generating software 126. If in block 508 the receiving of all the packets of printable pixel data for an image is not complete, then control passes to block 510.

In block 510, sweep control 310 checks periodically on the status of print engine component 300, and waits until the status is clear to receive more packets of printable pixel data from computer component 100 (FIG. 1). When the status is clear, control passes to block 512, where sweep control 310 sends a feedback control message to computer component 100 to send more packets of printable pixel data. Control then returns to block 500. For example, if the feedback control message reports that image transfer component 340 (FIG. 3) is out of medium 348, indicating that a new roll of medium 348 must be installed, then computer component 100 will not send any more packets of printable pixel data until the roll of medium 348 is installed. Once installed, sweep control 310 sends a feedback control messages indicating that it is now ready to receive more packets of printable pixel data.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for transferring data with feedback control within a printer system, said method comprising the steps of:

(a) receiving image data within a computer component of said printer system;

(b) processing said image data in a central processing unit in said computer component to create a plurality of packets of printable pixel data for a first image;

(c) sending a first packet of said printable pixel data from said central processing unit to a local bus card in said computer component;

(d) sending said first packet of said printable pixel data from said local bus card over a high-speed communication pathway to an interface located in a print engine component of said printer system;

(e) receiving, from said interface, into a buffer connected to said interface, a first row of said printable pixel data from said first packet of said printable pixel data; and (f) processing, in said print engine component, said first row of said printable pixel data received from said buffer, wherein an output of said print engine component in processing said first row of said printable pixel data is transferred to a medium within said print engine component.

2. The method for transferring data with feedback control within a printer system according to claim 1 further comprising the step of:

(g) repeating steps (e) and (f) for additional rows of said printable pixel data from said first packet of said printable pixel data.

3. The method for transferring data with feedback control within a printer system according to claim 2 further comprising the step of:

(h) repeating steps (c) through (g) for a plurality of additional packets of said printable pixel data.

4. The method for transferring data with feedback control within a printer system according to claim 2 wherein step (c) further comprises step (c1):

(c1) sending said first packet of said printable pixel data from said central processing unit in said computer component over a local bus in said computer component to said local bus card in said computer component.

5. The method for transferring data with feedback control within a printer system according to claim 4 wherein said local bus is a PCI local bus.

6. The method for transferring data with feedback control within a printer system according to claim 4, further comprising the steps of:

(h) receiving, in a sweep control in said print engine component, state information for said print engine component;

(i) sending, based on said state information for said print engine component, at least one feedback control message from said sweep control over a communications bus to said interface, and from said interface over a low-speed communication pathway to said local bus card, wherein said low-speed communication pathway connects said interface to said local bus card, and from said local bus card over said local bus to said central processing unit; and (j) processing said at least one feedback control message in said central processing unit to determine if said print engine component is ready to receive a next packet of said printable pixel data.

7. The method for transferring data with feedback control within a printer system according to claim 6, further comprising the steps of:

(k) when step (j) determines that said print engine component is ready to receive said next packet of said printable pixel data, performing step (l) and not steps (m) and (n), and when step (j) determines that said print engine component is not ready to receive said next packet of said printable pixel data, performing steps (m) and (n) and not step (l);

(l) repeating steps (c) through (k) for said next packet of said printable pixel data;

(m) determining if all of said plurality of packets of printable pixel data for said first image have been received by said print engine component;

(n) when step (m) determines that all of said plurality of packets of printable pixel data for said first image have not been received by said print engine component, performing steps (o) through (q) and not step (r), and when step (m) determines that all of said plurality of packets of printable pixel data for said first image have been received by said print engine component, performing step (r) and not steps (o) through (q);

(o) checking periodically, by a controller, on said state information of said print engine component until said print engine component is ready to receive said next packet of said printable pixel data;

(p) sending a ready to receive feedback control message to said computer component to send said next packet of said printable pixel data;

(q) repeating steps (j) through (p) for said next packet of said printable pixel data; and (r) repeating steps (a) through (q) for a next image.

8. The method for transferring data with feedback control within a printer system according to claim 6 wherein said low-speed communication pathway is a serial cable.

9. The method for transferring data with feedback control within a printer system according to claim 1 wherein said image data is digital image data.

10. The method for transferring data with feedback control within a printer system according to claim 1 wherein said central processing unit of said computer component is a Pentium processor.

11. The method for transferring data with feedback control within a printer system according to claim 1 wherein said local bus card is a PCI local bus card.

12. The method for transferring data with feedback control within a printer system according to claim 1 wherein said high-speed communication pathway is a serial fibre channel.

13. The method for transferring data with feedback control within a printer system according to claim 1 wherein said print engine component is a photographic process printer engine, and further wherein said medium is a photosensitive medium.

14. The method for transferring data with feedback control within a printer system according to claim 1 wherein said print engine component is an ink jet printer engine, and further wherein said medium is paper.

15. The method for transferring data with feedback control within a printer system according to claim 1 wherein said print engine component is a laser printer engine, and further wherein said medium is paper.

16. The method for transferring data with feedback control within a printer system according to claim 1 wherein said print engine component is a semiconductor laser diode printer engine, and further wherein said medium is paper.

17. The method for transferring data with feedback control within a printer system according to claim 1 wherein said print engine component is a three-color semiconductor laser diode printer engine, and further wherein said medium is paper.

18. The method for transferring data with feedback control within a printer system according to claim 1, wherein step (f) further comprises the following step (f1):

(f1) controlling said processing of said first row of said printable pixel data from a sweep control connected to said interface and connected to said buffer.

19. The method for transferring data with feedback control within a printer system according to claim 18, wherein step (b) further comprises step (b1), and step (f1) further comprises step (f1a):

(b1) placing at least one control command within a header within each of said plurality of packets of printable pixel data for said first image; and (f1a) controlling, by said sweep control, said processing of said first row of said printable pixel data, by said sweep control reading said at least one control command within said header within each of said plurality of packets of printable pixel data for said first image.

20. A printer system for transferring data with feedback control, said printer system comprising:

a computer component, said computer component further comprising
a central processing unit, wherein said central processing unit receives image data and processes said image data to create a plurality of packets of printable pixel data for a first image;
a local bus card connected to said central processing unit; and a print engine component, said print engine component further comprising
an interface; and
a sweep control connected to said interface; and a high-speed communication pathway connecting said local bus card of said computer component with said interface of said print engine component;

wherein, said plurality of packets of printable pixel data are sent from said central processing unit to said local bus card, and over said high-speed communication pathway to said interface, wherein an output of said print engine component for processing said plurality of packets of printable pixel data is transferred to a medium within said print engine component.

21. The printer system for transferring data with feedback control according to claim 20 wherein said image data is digital image data.

22. The printer system for transferring data with feedback control according to claim 20 wherein said central processing unit of said computer component is a Pentium processor.

23. The printer system for transferring data with feedback control according to claim 20 wherein said computer component further comprises:

a local bus connecting said central processing unit to said local bus card.

24. The printer system for transferring data with feedback control according to claim 23 wherein said local bus is a PCI local bus.

25. The printer system for transferring data with feedback control according to claim 20 wherein said local bus card is a PCI local bus card.

26. The printer system for transferring data with feedback control according to claim 20 wherein said high-speed communication pathway is a serial fibre channel.

27. The printer system for transferring data with feedback control according to claim 20 wherein said print engine component is a photographic process printer engine, and further wherein said medium is a photosensitive medium.

28. The printer system for transferring data with feedback control according to claim 20 wherein said print engine component is an ink jet printer engine, and further wherein said medium is paper.

29. The printer system for transferring data with feedback control according to claim 20 wherein said print engine component is a laser printer engine, and further wherein said medium is paper.

30. The printer system for transferring data with feedback control according to claim 20 wherein said print engine component is a semiconductor laser diode printer engine, and further wherein said medium is paper.

31. The printer system for transferring data with feedback control according to claim 20 wherein said print engine component is a three-color semiconductor laser diode printer engine, and further wherein said medium is paper.

32. The printer system for transferring data with feedback control according to claim 20 wherein said plurality of packets of printable pixel data further comprise at least one control command within a header within each of said plurality of packets of printable pixel data for said first image.

33. The printer system for transferring data with feedback control according to claim 32 wherein said print engine component further comprises:
 a communications bus connecting said sweep control to said interface; and
 a buffer, wherein said buffer is connected to said interface and connected to said sweep control, and further wherein said buffer receives from said interface a first row of said printable pixel data from a first packet of said printable pixel data received in said interface, and said sweep control receives from said interface over said communications bus said at least one control command within said header within said first packet of said printable pixel data for said first image.

34. A printer system for transferring data with feedback control, said printer system comprising:
 a computer component, said computer component further comprising
  a central processing unit, wherein said central processing unit receives image data and processes said image data to create a plurality of packets of printable pixel data for a first image;
  a local bus card connected to said central processing unit; and
 a print engine component, said print engine component further comprising
  an interface;
  a sweep control connected to said interface; and
 a high-speed communication pathway connecting said local bus card of said computer component with said interface of said print engine component; and
 a low-speed communication pathway connecting said local bus card of said computer component with said interface of said print engine component;
 wherein, said plurality of packets of printable pixel data are sent from said central processing unit to said local bus card over said high-speed communication pathway to said interface, wherein an output of said print engine component for processing said plurality of packets of printable pixel data is transferred to a medium within said print engine component, and further wherein said sweep control receives state information on said print engine component, and sends at least one feedback control message based on said state information to said interface, and from said interface over said low-speed communication pathway to said local bus card, and from said local bus card to said central processing unit.

35. The printer system for transferring data with feedback control according to claim 34 wherein said image data is digital image data.

36. The printer system for transferring data with feedback control according to claim 34 wherein said central processing unit of said computer component is a Pentium processor.

37. The printer system for transferring data with feedback control according to claim 34 wherein said computer component further comprises:
 a local bus connecting said central processing unit to said local bus card.

38. The printer system for transferring data with feedback control according to claim 37 wherein said local bus is a PCI local bus.

39. The printer system for transferring data with feedback control according to claim 34 wherein said local bus card is a PCI local bus card.

40. The printer system for transferring data with feedback control according to claim 34 wherein said high-speed communication pathway is a serial fibre channel.

41. The printer system for transferring data with feedback control according to claim 34 wherein said print engine component is a photographic process printer engine, and further wherein said medium is a photosensitive medium.

42. The printer system for transferring data with feedback control according to claim 34 wherein said print engine component is an ink jet printer engine, and further wherein said medium is paper.

43. The printer system for transferring data with feedback control according to claim 34 wherein said print engine component is a laser printer engine, and further wherein said medium is paper.

44. The printer system for transferring data with feedback control according to claim 34 wherein said print engine component is a semiconductor laser diode printer engine, and further wherein said medium is paper.

45. The printer system for transferring data with feedback control according to claim 34 wherein said print engine component is a three-color semiconductor laser diode printer engine, and further wherein said medium is paper.

46. The printer system for transferring data with feedback control according to claim 34 wherein said low-speed communication pathway is a serial cable.

47. The printer system for transferring data with feedback control according to claim 34 wherein said plurality of packets of printable pixel data further comprise at least one control command within a header within each of said plurality of packets of printable pixel data for said first image.

48. The printer system for transferring data with feedback control according to claim 47 wherein said print engine component further comprises:
 a communications bus connecting said sweep control to said interface; and
 a buffer, wherein said buffer is connected to said interface and connected to said sweep control, and further wherein said buffer receives from said interface a first row of said printable pixel data from a first packet of said printable pixel data received in said interface, and said sweep control receives from said interface over said communications bus said at least one control command within said header within said first packet of said printable pixel data for said first image.

* * * * *